(12) United States Patent
Kamite et al.

(10) Patent No.: US 6,464,911 B1
(45) Date of Patent: *Oct. 15, 2002

(54) METHOD FOR PRODUCING A WOOD-LIKE MOLDED RESIN PRODUCT

(75) Inventors: Masayuki Kamite; Konomi Hasumi, both of Tokyo; Nobuhiro Mukai, Toyama; Masaaki Shibazaki, Toyama; Kaori Fujita, Toyama, all of (JP)

(73) Assignees: Misawa Homes Co., Ltd (JP); Du Pont-MRC Co., Ltd (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,525
(22) PCT Filed: Jun. 17, 1998
(86) PCT No.: PCT/JP98/02662
§ 371 (c)(1),
(2), (4) Date: Dec. 7, 1999
(87) PCT Pub. No.: WO98/58787
PCT Pub. Date: Dec. 30, 1998

(30) Foreign Application Priority Data

Jun. 24, 1997 (JP) ............................................. 9-167706

(51) Int. Cl.⁷ ......................... B29C 41/22; B29C 39/12
(52) U.S. Cl. ........................ 264/73; 264/245; 425/130; 425/112; 425/472
(58) Field of Search ......................... 264/245, 73, 139, 264/284, 294, 297.8, 246, 247, 255, 250, 511, 138; 425/115, 130, 197, 198, 199, 112, 289, 308, 403, 470, 472

(56) References Cited

U.S. PATENT DOCUMENTS

| | | | |
|---|---|---|---|
| 1,416,325 A | * | 5/1922 | Berry |
| 1,657,784 A | * | 1/1928 | Bergstrom |
| 2,052,695 A | | 9/1936 | Chiverton ..................... 18/15 |
| 3,473,193 A | | 10/1969 | Quackenbush et al. ........ 18/13 |
| 3,485,912 A | | 12/1969 | Schrenk et al. ............. 264/171 |
| 3,565,737 A | | 2/1971 | Lefevre et al. ................ 161/36 |
| 3,832,264 A | * | 8/1974 | Barnette |
| 4,128,386 A | | 12/1978 | Wissinger et al. ........... 425/462 |
| 4,185,951 A | | 1/1980 | Webermeier et al. ..... 425/133.5 |
| 4,280,950 A | * | 7/1981 | Nagata et al. |
| 5,540,871 A | * | 7/1996 | Uchida et al. |
| 5,662,847 A | * | 9/1997 | Uchida et al. |
| 5,679,298 A | * | 10/1997 | Uchida et al. |
| 5,698,032 A | * | 12/1997 | Weis |
| 5,837,175 A | * | 11/1998 | Mukai et al. |

FOREIGN PATENT DOCUMENTS

| | | | |
|---|---|---|---|
| EP | 0 283 809 A2 | 9/1988 | ........... B29C/47/04 |
| EP | 0 667 249 A1 | 8/1995 | ............. B44C/3/04 |
| EP | 0 842 750 A1 | 5/1998 | ........... B29C/41/22 |
| FR | 1 404 594 A | 11/1965 | |
| JP | 53-90372 | 8/1978 | ............. B29F/3/12 |
| JP | 60-104308 | 6/1985 | ........... B29C/47/02 |
| JP | 6-170910 | 6/1994 | ........... B29C/47/00 |
| JP | 7-195480 | 8/1995 | ........... B29C/47/06 |
| JP | 7-195484 | 8/1995 | ........... B29C/47/10 |
| JP | 7-232369 | 9/1995 | ........... B29C/47/10 |
| JP | 7-246647 | 9/1995 | ........... B29C/47/08 |
| JP | 9-11303 | 1/1997 | ........... B29C/47/00 |
| WO | WO 94/20280 | 9/1994 | ........... B29C/47/00 |
| WO | WO 96/15895 | 5/1996 | ........... B29C/47/04 |

* cited by examiner

*Primary Examiner*—Jan H. Silbaugh
*Assistant Examiner*—Geoffrey P. Shipsides
(74) *Attorney, Agent, or Firm*—Pennie & Edmonds LLP

(57) ABSTRACT

The method for producing a molded resin product with a simulated wood grain pattern on an exterior surface according to the present invention comprises the steps of: supplying a first molten resin into a mold cell to form a resin layer with said exterior surface; making a plurality of grooves through said resin layer so as to reach said exterior surface before said molten resin solidifies; filling up said grooves with a second molten resin such that said exterior surface exhibits simulated wood grain patterns; and solidifying said first resin and said second resin.

17 Claims, 3 Drawing Sheets

METHOD FOR PRODUCING A WOOD-LIKE MOLDED RESIN PRODUCT

TECHNICAL FIELD

The present invention relates to a method and an apparatus for producing a molded resin product with a simulated wood grain pattern on an exterior surface thereof.

This application is based on Japanese Patent Application No. Hei 9-167706, the contents of which are incorporated herein by reference.

BACKGROUND ART

Molded resin products with simulated wood grain patterns, which are inexpensive and durable, have been substituted for natural wood in desks, furniture, walls, and floors in recent years. The molded resin products exhibit simulated wood grain patterns on their surface, which are achieved by forming layers with different colors.

A prior method for producing a molded resin product with simulated wood grain patterns comprises the steps of supplying a synthetic molten resin, which includes resins with different colors, into a mold cell, and solidifying the synthetic resin so as to achieve simulated wood grain patterns, as disclosed in U.S. Pat. No. 3,565,737 and JP-A-53090372.

However, the reproduced wood grain appearance of the molded resin product of the prior method may often be degraded because it depends on the condition of the mixture of the resins. A real wood grain appearance cannot be easily achieved because the patterns are stripes with different colors and widths positioned at irregular intervals.

DISCLOSURE OF INVENTION

It is therefore an object of the present invention to provide a method and an apparatus for manufacturing a molded resin product with wood grain patterns, the method easily producing molded resin products which are almost identical replicas of genuine wood and have grain patterns of different colors and widths positioned at irregular intervals.

In order to accomplish the above object, a method for producing a molded resin product with a simulated wood grain pattern on an exterior surface thereof, comprises the steps of: supplying a first molten resin into a mold cell to form a resin layer which forms the exterior surface; making a plurality of grooves through the resin layer so as to reach the exterior surface before the molten resin solidifies; filling up the grooves with a second molten resin such that the exterior surface exhibits simulated wood grain patterns; and solidifying the first resin and the second resin. The grains patterns showing a real wood appearance can be easily reproduced since the grooves are formed through the resin layer and the second molten resin is thereafter supplied into the grooves.

In another aspect of the present invention, a method for producing a molded resin product with a simulated wood grain pattern on an exterior surface thereof comprises the steps of: supplying a plurality of kinds of molten resin into a mold cell to form a plurality of resin layers, the lowest resin layer forming the exterior surface; making a plurality of grooves through the lowest resin layer to the exterior surface so as to fill up the grooves with the molten resin of an upper resin layer before the molten resin solidifies such that the exterior surface exhibits simulated wood grain patterns; and solidifying the resin layers. The grain patterns having a real wood appearance can be easily reproduced since a plurality of resin layers within the mold cell are formed and the grooves through the lowest resin layer are made so that the upper resin layer partly sinks into the grooves before the layers have solidified.

The grooves are preferably different in width, and the grooves are preferably provided at irregular intervals. The most natural wood grain patterns can be achieved because the grain patterns on the exterior surface are different in width and are positioned at irregular intervals due to the grooves having different widths and being positioned at irregular intervals.

A plurality of rods may be moved through the resin layer to make the grooves, thereby facilitating the manufacturing process of the wood-like molded resin product and enhancing the wood-like appearance. The exterior surface may be preferably arranged on the bottom of the cell, and the rods may be moved while in contact with the inside bottom of the mold cell.

In another aspect of the present invention, an apparatus for producing a molded resin product with a simulated wood grain pattern on the exterior surface thereof comprises: a mold cell having an inside surface on which an exterior surface of the molded resin product is disposed; a supply means for supplying molten resin into the mold cell; and a groove-forming means for forming a plurality of grooves through a resin layer within the mold cell, the groove-forming means having a plurality of rods which are movable while maintaining contact the inside surface of the mold cell. The grain patterns having a real wood appearance can be easily produced since a molten resin having a different color is supplied into the grooves of the resin layer to form wood-like grains on the surface in contact with the mold cell.

The rods are preferably different in width, and the rods are preferably provided at irregular intervals. The most natural wood grain patterns can be achieved because the grain patterns on the exterior surface are different in width and are positioned at irregular intervals due to the grooves having different widths and being positioned at irregular intervals. The inside surface may be disposed on the bottom in the mold cell.

BEST MODE FOR CARRYING OUT THE INVENTION

Figure 1:
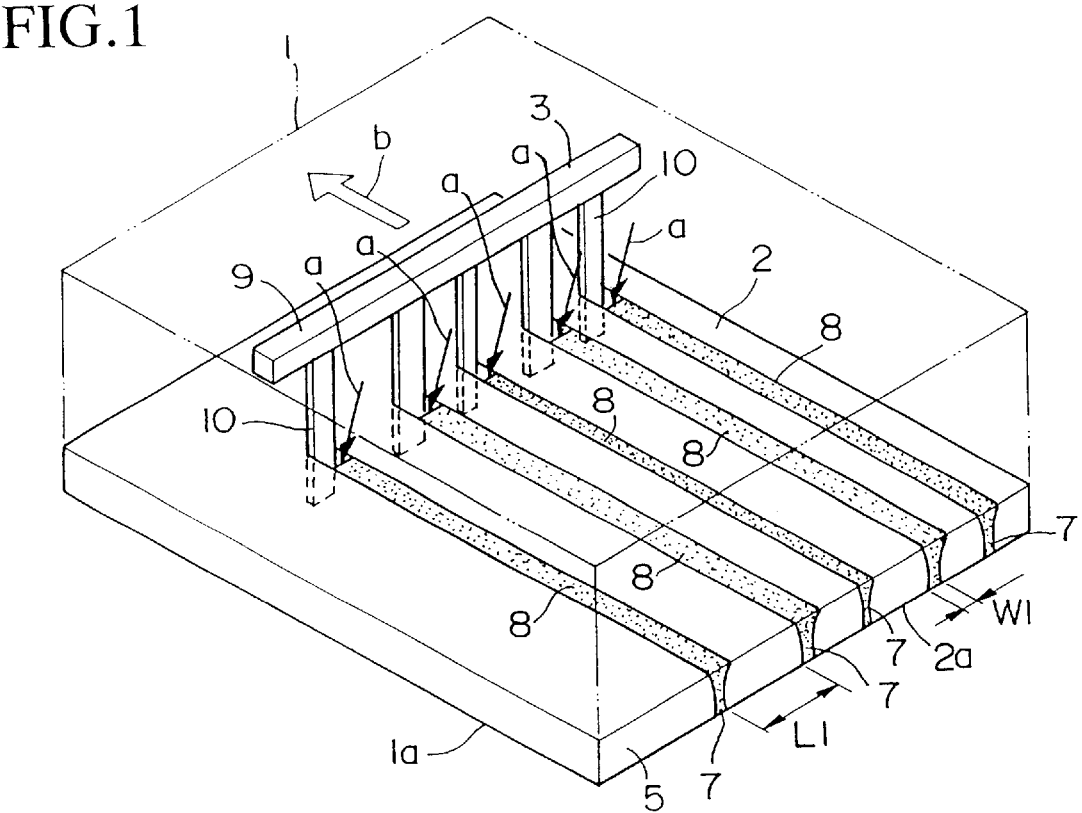
FIG. 1 is a detailed perspective view of an apparatus for producing a wood-like molded resin product of a first embodiment according to the present invention.
Figure 2:
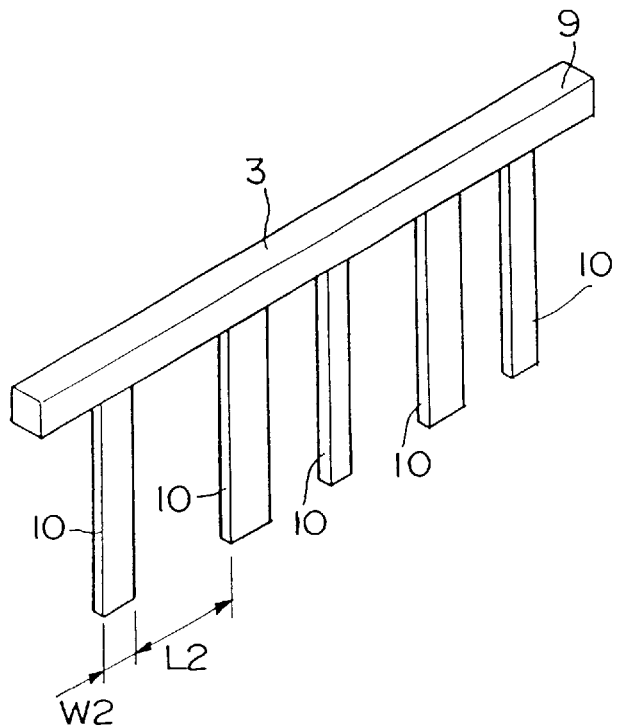
FIG. 2 is a perspective view of a groove-forming means (rake) of FIG. 1.

Referring to FIGS. 1 and 2, a first embodiment of the present invention will be explained.

Referring to FIG. 1, a detailed perspective view of an apparatus for producing a wood-like molded resin product is illustrated. Reference numeral 1 denotes a mold cell, reference numeral 2 denotes a wood-like molded resin product, and reference numeral 3 denotes a rake (groove-forming means).

The mold cell 1 is a hollow receptacle with an inside bottom surface 1a for receiving molten resin and in which the molten resin solidifies. An exterior surface 2a of the molded resin product 2, which solidifies in the mold cell 1, is disposed on the inside bottom surface 1a.

The wood-like molded resin product 2 has a predetermined height from the inside bottom surface 1a of the mold cell 1. Wood grain patterns are exhibited on the exterior surface 2a which is in contact with the inside bottom surface 1a. The wood-like molded resin product 2 comprises a resin layer (first resin layer) 5, and linear resin portions (second resin portions) 8 which are different in color from the resin layer 5.

The resin layer 5 is formed by supplying molten resin (first molten resin) through a resin layer supply means (resin supply means, not shown). A plurality of grooves 7 are formed through the resin layer 5 (in a depthwise direction) so as to reach the bottom surface 1a of the mold cell 1. The grooves 7 are different in width W1 and are provided at irregular intervals L1.

The linear resin portions 8 are located within the grooves 7 so as to reach the lowest end of the grooves 7, that is the bottom surface 1a of the mold cell 1, forming the exterior surface 2a of the wood-like molded resin product 2 along with the resin layer 5. The linear resin portions 8 are formed by filling the grooves 7 with the molten resin (second molten resin) from positions indicated with arrows "a" through a linear molten resin supply means (resin supply means, not shown).

The mixture used in the resin layer 5 and in the linear resin portions 8 may include a filler, a viscous fluid which is a mixture of a monomer such as a methacrylic acid ester and a polymer thereof, a color pigment, and a composition which includes a curing catalyst. The filler may be an inorganic filler such as magnesium hydroxide, calcium hydroxide, and aluminum hydroxide, or an organic filler such as a wood powder. The color pigment may be titanium oxide or zinc sulfide when a white color is desired, black iron oxide when a black color is desired, red iron oxide when a red color is desired, yellow iron oxide when a yellow color is desired, or ultramarine blue or phthalocyanine blue when a blue color is desired. The curing catalyst may be lauroyl peroxide, benzoyl peroxide, azobisisobutyronitrile, tertiary butyl hydroperoxide, or cumenehydroperoxide. In addition, a dye, an antioxidant, a superplasticizer, a thickener, a flame retarder, a polymerization inhibitor, or the like may be used if necessary in a given application.

The rake 3 comprises a holder 9 and a plurality of groove-forming members (rods or teeth) 10 attached thereto. The groove-forming members 10 are preferably formed of material which does not react with the molten resin of the linear resin portions and to which the molten resin does not adhere, for example metallic materials such as a stainless steel, copper alloys, aluminum alloys, or metallic material coated with polytetrafluoroethylene.

As shown in FIG. 2, the groove-forming members 10 have rectangular cross sections, are different in width W2 in a longitudinal direction of the rake 3 and are provided at irregular intervals L2. The rake 3 is moved by a drive means (not shown) in a direction indicated with an arrow "b" (in a direction perpendicular to the width W2 in FIG. 2), while the groove-forming members 10 are being moved in contact with the bottom surface 1a of the mold cell.

A method for producing the wood-like molded resin product 2 using the above-described configuration will be explained.

The molten resin supply means supplies the molten resin into the mold cell 1, thus forming the resin layer 5 having the predetermined height from the bottom surface 1a of the mold cell 1.

Before the resin layer 5 solidifies, the rake 3 is moved while the lower ends of the groove-forming members 10 are in contact with the bottom surface 1a of the mold cell 1 in the direction "b". The resin layer 5 is partly raked by the movement of the groove-forming member 10, thus forming a plurality of grooves 7. The grooves 7 reach the bottom surface 1a in the depthwise direction of the resin layer 5 because the ends of the groove-forming members 10 have been moved in contact with the bottom surface 1a of the mold cell 1.

The grooves 7 are different in width W1 because the groove-forming members 10 of the rake 3 are different in width W2, and are provided at irregular intervals L1 because the groove-forming members 10 are provided at irregular intervals L2.

After the grooves 7 are formed by the rake 3, the linear resin supply means supplies molten resin which is different in color from the resin layer 5, into the grooves 7 from the positions indicated with the arrows "a". Since the grooves 7 reach the bottom surface 1a in the depthwise direction of the resin layer 5, the molten resin flows into the grooves 7 to the bottom surface 1a, thus forming the linear resin portions 8.

The grooves 7 may disappear before the molten resin is supplied into the grooves 7 because the resin layer 5 which has not yet solidified may flows back into the grooves. To avoid this, the molten resin must be supplied into the grooves 7 before the grooves 7 disappear.

After the resin layer 5 and the linear resin portions 8 solidify, the wood-like molded resin product 2 is then removed from the mold cell 1, at which point the manufacturing of the product 2 is completed.

The molded resin product 2 shows the striped wood-like texture on the exterior surface 2a, in which the resin layer 5 and the linear resin portions 8 which have different colors from each other are alternately arranged and in which the linear resin portions 8 are different in width W1 and are provided at irregular intervals L1.

The wood-like molded resin product 2, which exhibits grains of different widths positioned at irregular intervals can be easily produced by means of the formation of the grooves 7 having different widths W1 and the supply of linear molten resin into the grooves 7. Further, grooves 7 having different widths W1 and positioned at the irregular intervals L1 can be easily formed using the rake 3 which has groove-forming members 10 of different widths W2 positioned at irregular intervals L2.

The number of the grooves 7 is not limited to this embodiment in FIG. 1, and the number of the groove-forming members 10 of the rake 3 is not limited to the embodiment in FIG. 2. Although the grooves 7 are approximately straightly formed, the shapes of the grooves are not limited to the embodiment, and may meander if desirable.

Figure 3:
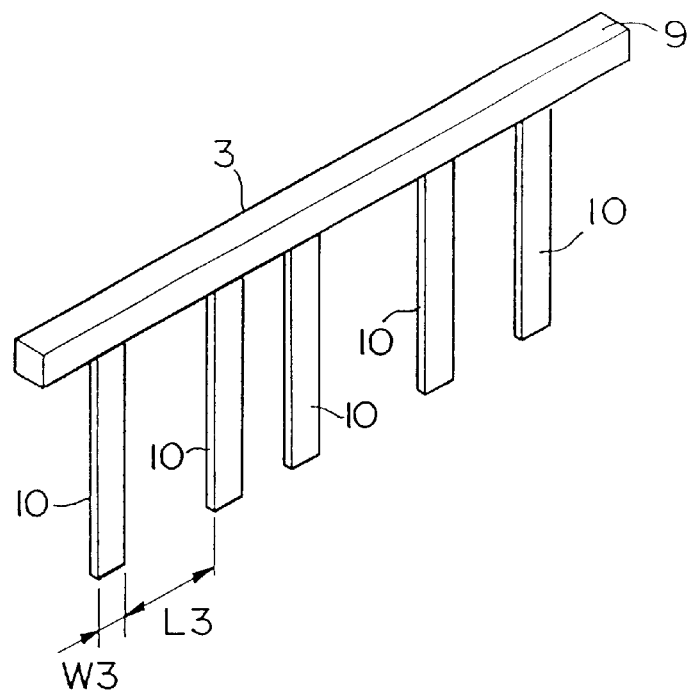
FIG. 3 is a perspective view of a modification of the groove-forming means of the present invention.
Figure 4:
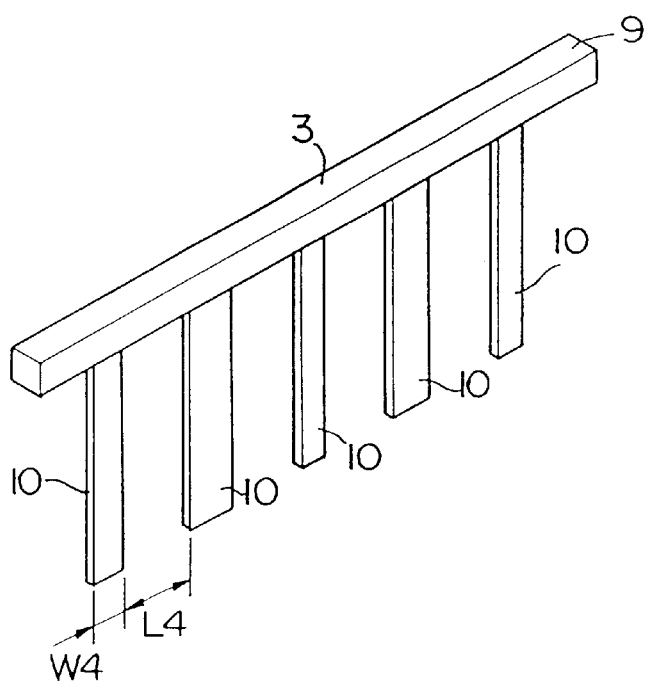
FIG. 4 is a perspective view of another modification of the groove-forming means of the present invention.

As shown in FIG. 3, the groove-forming members 10 may have the same widths W3 and are positioned at irregular intervals L3. As shown in FIG. 4, the groove-forming members 10 may have different widths W4 and are positioned at the regular intervals.

A second embodiment will be explained with reference to FIG. 5, in which the same reference numerals will denote parts similar to those previously described in the first embodiment of FIG. 1, for which detailed descriptions will be omitted.

Figure 5:
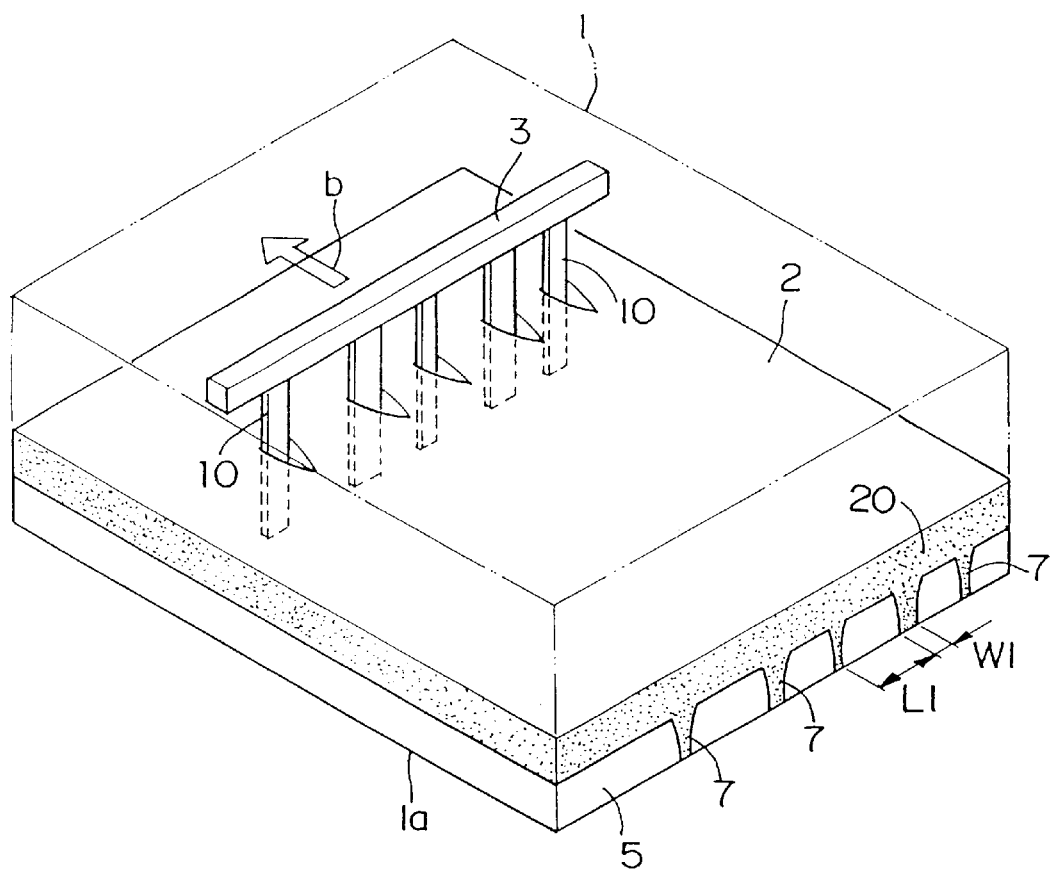
FIG. 5 is a detailed perspective view of an apparatus for producing a wood-like molded resin product of a second embodiment according to the present invention.

In FIG. 5, reference numeral 20 denotes the upper resin layer. The upper resin layer 20 is different in color from a lower resin layer 5, and is disposed thereon at a predetermined height. The upper resin layer 20 is formed within the mold cell 1 by an upper molten resin supply means.

The upper resin layer 20 partly flows into a plurality of grooves 7 in the lower resin layer 5. The upper resin layer 20 is made of the same material described above in the first embodiment.

A method for producing the wood-like molded resin product 2 using the above-described configuration will be explained with reference to FIG. 5.

The lower molten resin supply means supplies the lower molten resin into the mold cell 1 in order to form the lower resin layer 5 in a fashion similar to the first embodiment. The upper molten resin supply means supplies the upper resin layer 20 onto the lower resin layer 5, thus forming two layers.

Before the lower resin layer 5 and the upper resin layer 20 solidify, a rake 3 is moved while the ends of groove-forming members 10 are in contact with the bottom surface 1a of the mold cell 1 in the direction "b". The lower resin layer 5 and the upper resin layer 20 are partly raked by the movement of the groove-forming member 10, thus forming a plurality of grooves 7. The grooves 7 are then filled with the upper resin layer 20 since the lower resin layer 5 and the upper resin layer 20 have not yet solidified.

The portions of the upper resin layer 20 which have flown into the grooves 7 reach the bottom surface 1a of the mold cell 1, because the ends of the groove-forming members 10 has been moved in contact with the bottom surface 1a of the mold cell 1 to allow the grooves 7 to reach the bottom surface 1a in a depthwise direction of the lower resin layer 5.

The grooves 7 are different in width W1 because the groove-forming members 10 of the rake 3 are different in width W2, and are provided at irregular intervals L1 because the groove-forming members 10 are provided at irregular intervals L2.

The steps of solidifying the lower resin layer 5 and the upper resin layer 20 within the mold cell 1 to form the wood-like molded resin product 2 are carried out in a fashion similar to the first embodiment, for which detailed descriptions will be omitted.

The wood-like molded resin product 2 which exhibits grains of different widths positioned at irregular intervals, can be easily produced because the lower resin layer 5 and the upper resin layer 20 within the mold cell 1 are formed and the grooves 7 are made so as to allow the upper resin layer 20 to flow into the grooves 7 before the layers 5 and 20 have solidified.

Although the second embodiment includes two upper and lower layers 5 and 20, the number of the layers is not limited to that of the embodiment, and more than three layers may be employed.

Various modifications may be made to the shapes of the grooves 7, which are not limited to straight lines, and to the widths and intervals of the groove-forming members 10 of the rake 3, as described in the description of the first embodiment.

Further, the rake 3 may be moved at a regular or irregular speed. The grain patterns may be narrow when the rake 3 is moved fast, whereas the grain patterns may be wider when the rake 3 is moved slowly. A modification may be made to the cross sections of the groove-forming members 10, and the front side of the members 10 may be, for example, convex or projected. The second molten resin in the first embodiment may be regularly or irregularly supplied to change the widths of the grain patterns.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

INDUSTRIAL APPLICABILITY

According to the present invention, grains patterns showing a real wood appearance can be easily reproduced, since grooves are formed through a resin layer and a second molten resin is thereafter supplied into the grooves, or since a plurality of resin layers within the mold cell are formed and grooves through the lowest resin layer are made so that the upper resin layer partly sinks into the grooves before the layers have solidified.

What is claimed is:

1. A method for producing a molded resin product with simulated wood grain patterns on an exterior surface thereof, comprising the steps of:

supplying a first molten resin into a mold cell to form a resin layer with said exterior surface;

making a plurality of grooves through said resin layer so as to reach said exterior surface by moving a plurality of pillars through said resin layer while in contact with an inside surface of said mold cell before said molten resin solidifies;

filling up said grooves with a second molten resin such that said exterior surface exhibits simulated wood grain patterns;

solidifying said first resin and said second resin; and moving said pillars at an irregular speed to thereby form simulated wood grain patterns having irregular widths on the exterior surface of the molded resin product.

2. A method according to claim 1, wherein said grooves are different in width.

3. A method according to claim 1, wherein said grooves are provided at irregular intervals.

4. A method according to claim 1, wherein said exterior surface is arranged on the bottom of said cell, said pillars being moved while in contact with the inside bottom of said mold cell.

5. A method according to claim 1, wherein the front sides of said pillars are convex or projected.

6. A method according to claim 1, wherein the second molten resin is regularly or irregularly supplied to change the widths of the grain patterns.

7. A method for producing a molded resin product with simulated wood grain patterns on an exterior surface thereof, comprising the steps of:

supplying a plurality of kinds of molten resin into a mold cell to form a plurality of resin layers, the lowest resin layer having said exterior surface;

making a plurality of grooves through said lowest resin layer to said exterior surface by moving a plurality of pillars through said lowest resin layer while in contact with an inside surface of said mold cell such that said grooves fill up with said molten resin of said upper resin layer before said molten resin solidifies such that said exterior surface exhibits simulated wood grain patterns;

solidifying said resin layers; and moving said pillars at an irregular speed to thereby form simulated wood grain patterns having irregular widths on the exterior surface of the molded resin product.

8. A method according to claim 7, wherein said grooves are different in width.

9. A method according to claim 7, wherein said grooves are provided at irregular intervals.

10. A method according to claim 7, wherein said exterior surface is arranged on the inside bottom of said mold cell, said pillars being moved while in contact with the inside bottom of said mold cell.

11. A method according to claim 7, wherein the front sides of said pillars are convex or projected.

12. An apparatus for producing a molded resin product with simulated wood grain patterns on the exterior surface thereof, comprising:

a mold cell having an inside surface on which an exterior surface of said molded resin product is disposed;

a supply means for supplying molten resin into said mold cell; and a groove-forming means for forming a plurality of grooves through a resin layer within said mold cell, said groove-forming means having a plurality of pillars and means for moving said groove-forming means at an irregular speed while in contact with said inside surface of said mold cell to thereby form simulated wood grain patterns having irregular widths on the exterior surface of the molded resin product.

13. An apparatus according to claim 12, wherein said pillars are different in width.

14. An apparatus according to claim 12, wherein said pillars are provided at irregular intervals.

15. An apparatus according to claim 12, wherein said inside surf ace is disposed on the bottom in said mold cell.

16. An apparatus according to claim 9, wherein the front sides of said pillars are convex or projected.

17. An apparatus according to claim 12, wherein said supply means regularly or irregularly supplies the molten resin to change the widths of the grain patterns.

\* \* \* \* \*